United States Patent Office 3,766,267
Patented Oct. 16, 1973

3,766,267
QUATERNARY HALIDES OF GLUCONAMIDES
Henry Zak, Great Notch, and Donald E. Conner, Clifton, N.J., assignors to Van Dyk & Company, Incorporated, Belleville, N.J.
No Drawing. Filed Mar. 3, 1971, Ser. No. 120,733
Int. Cl. C07c 103/30
U.S. Cl. 260—561 B     3 Claims

ABSTRACT OF THE DISCLOSURE

Novel compositions of matter consisting of quaternary halides of trialkyl or hydroxyalkyl amino alkyl gluconamides have been found to be excellent emollients having high substantivity for skin. They are prepared, for example, by the condensation of delta gluconolactone with gamma dimethylaminopropyl amine and the the resulting gluconamide quaternized by reaction with an alkyl halide or hydroxyalkyl halide.

FIELD OF THE INVENTION

There is an ever-increasing need for improved emollients, particularly in applications involving topical or cosmetic uses where a high degree of substantivity to skin is desired and compatibility with hydrophylic adjuvants is required. This invention provides novel synthetic cationic emollients having outstanding properties for the purposes mentioned.

DESCRIPTION OF PRIOR ART

U.S. Patent 2,662,073 describes the preparation of alkyl gluconamides and their use as non-ionic wetting agents and discloses sulfated long-chain gluconamides as anionic detergents. Both materials may be distinguished from the cationic products of the instant invention in that the non-ionic products lack substantivity, and the anionic materials are incompatible with cationic reagents.

British Patent 1,161,552 discloses the preparation of 2-hydroxy-1,3-bis(trialkyl) propylene diammonium dichlorides and 2-hydroxy-1,3-bis(dialkyl,alkylpolyoxyethyl) propylene diammonium dichlorides as softeners for textile fabrics. Products of the type disclosed in this patent may be distinguished from the products of the instant invention in that the prior art materials possess a single hydroxyl group as compared to the polyhydroxy chain derived from the gluconolactone, and have negative coefficients of solubility with increasing temperature due to the loss in hydrogen bonding of the polyether oxygens.

SUMMARY OF THE INVENTION

In accordance with this invention, we have now found that quaternary chlorides of N,N,N-trialkylaminoalkylene gluconamides having formulae selected from the group consisting of:

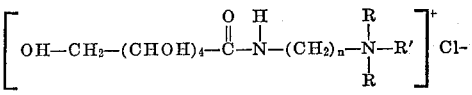

and bis-quaternary halide salts of N,N,N',N'-tetraalkyl diazaalkylene bis-gluconamides having formulae selected from the group consisting of:

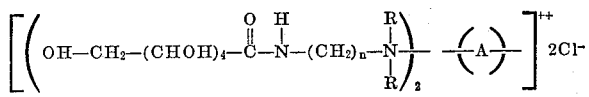

wherein R is independently selected from the group consisting of methyl, ethyl and beta-hydroxyethyl radicals; R' is independently selected from the group consisting of $C_1$ to $C_{12}$ alkyl, benzyl and beta-hydroxyethyl radicals; A is a straight-chain terminally substituted alkylene radical having from 2 to 6 carbon atoms; and $n$ is an integer of from 2 to 4; have excellent emollient properties, are readily adjusted to a pH of between 4 and 5 in solution and are accordingly substantive to skin and hair which have an isoelectric point of 3.7 to 4.1 and are compatible with hydrophylic adjuvants which aid in maintaining an adequate moisture interface with the skin. While not wishing to be bound by any theory of operation it is believed that the superior qualities of emolliency, slip, penetration and occlusion which the products of this invention possess, are recognized as desiderata by those having skill in the cosmetic art and are due to the polyhydroxyalkyl structure of the gluconamide moiety.

DISCUSSION OF PREFERRED EMBODIMENTS

The novel products of this invention may be prepared by the condensation of a lactone of gluconic acid with gamma dimethylaminopropylamine to form a gluconamide which is further reacted with an alkyl halide or hydroxyalkylene halide to yield the quaternary salt. Alternatively, final condensation may be with a dihaloalkane to yield a bis-quaternary salt.

The reactions may be illustrated in a preferred embodiment as follows:

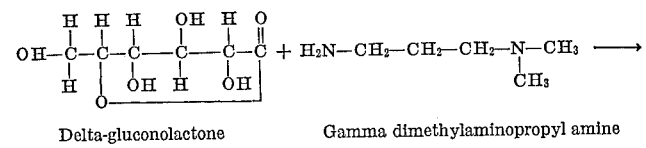

Delta-gluconolactone     Gamma dimethylaminopropyl amine     Gamma dimethylaminopropyl gluconamide     (1)

Reaction of the gluconamide with ethylene chlorohydrin yields the quaternary chloride salt:

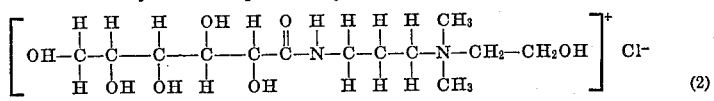

(2)

Alternatively, the gluconamide (1) may be reacted with 1,4-dichlorobutane to yield a bis-quaternary chloride salt:

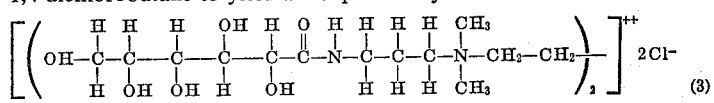

(3)

Methods for the preparation of the dialkylaminoalkyl gluconamide may be varied, depending on the nature of the diamine, solubility of the lactone or hexuronic acid and the like. In general, polar solvents, such as the lower alcohols having boiling points in the range of about 65° C. to 120° C. are preferred. The diamine and lactone may be mixed or suspended in a solvent and heated with stirring under reflux, or the diamine may be dissolved in the solvent, and the lactone which has a limited solubility may be added portion-wise to the reaction mixture.

Since water will hydrolyze the lactone to the acid, it is desirable to exclude moisture from the system and use dry solvents.

Amides usually have low solubilities in alcohols, and the gluconamide may be isolated from the reaction mixture by removing part of the solvent and cooling to crystallization. Where the amide is to be converted to a quaternary salt as in the instant invention, it is not necessary to isolate the intermediate amide from solution and it can be reacted directly with the alkyl halide to form the quaternary salt.

Due to the hydrophylic character of the gluconic acid moiety, the amides are readily soluble in water which may serve as a reaction medium for the formation of the quaternary salt.

While the wide variety of dialkylaminoalkyl amines may be used for the formation of the gluconamide and a sampling of mono and dihalo alkanes listed below may be used for formation of the quaternary salts of the gluconamides, gamma dimethylaminopropylamine is particularly preferred for conversion of the lactone to the amide and ethylene chlorohydrin and 1,4-dichlorobutane are particularly preferred for the preparation of the mono and bis quaternary ammonium chloride salts. As used herein, the term "quaternary salt" includes both the mono and bis quaternary ammonium halides.

This invention, product work-up and properties of these novel materials will be better understood by reference to the following examples.

EXAMPLE 1

Preparation of gamma dimethylaminopropyl gluconamide

Five moles (890 grams) of delta-gluconolactone were admixed with five moles (510 grams) of gamma-dimethylaminopropyl amine and 2.5 liters (1973 grams) of commercially anhydrous isopropyl alcohol in a reaction flask fitted with a stirrer, thermometer and reflux condenser. The mixture was heated to boiling with stirring and refluxed for one hour. The homogeneous solution was transferred, after cooling to 70° C., to a distillation flask and the isopropyl alcohol taken overhead at a pressure of 10–15 torr, using a water aspirator as a source of vacuum. When all of the alcohol was removed (pot temperature, 85° C.), 1800 grams of water were added to give a homogeneous solution of the gluconamide.

EXAMPLE 2

Preparation of the ethylene chlorohydrin quaternary salt

The reaction product for Example 1 was transferred to a reaction flask fitted with a stirrer, thermometer, dropping funnel and reflux condenser and the flask contents heated with stirring to about 85° C. whereupon five moles (403 grams) of anhydrous ethylene chlorohydrin were slowly added over the course of about one hour. After all of the chlorohydrin had been added, the heat was increased to the boiling point and the reaction mixture heated under reflux for a total reaction time of five hours. After partially cooling the reaction mixture, it was transferred to a distillation flask and about 750 ml. of distillate, comprising traces of isopropanol, a small amount of unreacted ethylene chlorohydrin and water, were taken overhead at a final vapor temperature of 100° C. The slightly amber solution was decolorized by boiling under reflux for ten minutes with 25 grams of decolorizing charcoal, filtered through a Büchner funnel and cooled to room temperature. There was obtained 3000 grams of solution containing 60% of product by weight. Analysis of the solution showed an ionic chlorine content of 6.04% by weight.

EXAMPLE 3

Preparation of the 1,4-dichlorobutane bis-quaternary compound

A second 5-mole batch of gamma dimethylaminopropyl gluconamide was prepared as in Example 1, and reacted with 2.5 moles (317.5 grams) of 1,4-dichlorobutane. When reaction was complete the product was worked up and finished to a 60% by weight aqueous solution as in Example 2.

EXAMPLE 4

Preparation of gamma-diethylaminopropyl gluconamide

A 5-mole batch of this gluconamide was prepared from 890 grams of delta-gluconolactone and 650 grams of N,N-diethyl-1,3-propanediamine in the same amount as the dimethyl compound of Example 1.

Aliquots of the aqueous solution of the gluconamide were quaternized with n-butyl chloride, 2-ethyl hexyl chloride, ethylene chlorohydrin, epichlorohydrin and beta,beta-dichloroethyl ether.

EXPERIMENTS DEMONSTRATING SUBSTANTIVITY

EXAMPLE 5

Substantivity to wool

Ten grams of clean, dry, undyed woolen cloth which had been previously extracted so as to free it from oily and water soluble materials was cut into one-inch squares and packed into a glass tube having an I.D. of one-half inch and a length of twenty inches. The tube was equipped with an enlarged section which acted as a reservoir for the addition of reagents, when the packed tube was supported in a vertical position. The lower end of the tube was fitted to a vacuum Erlenmeyer flask and the vacuum adjusted so as to permit the passage of 100 ml. of reagent through the packed wool over a period of two minutes.

Three 100 ml. portions of hot isopropyl alcohol, previously freed of chlorides by distillation over silver nitrate and alkali, was passed through the wool and the washings were found to be free of any trace of ionic chloride. The isopropyl alcohol was eluted from the wool by passing ten 100 ml. portions of de-ionized water through the wool and in each instance the washings were found to be free of chloride ion when tested with silver nitrate. The last 100 ml. washing was saved as a blank sample and labelled No. 1.

One hundred ml. of a solution of the quaternary ammonium chloride product of Example 2, having a concentration of 0.025 gram per liter, was then recycled through the moist woolen cloth for a total of three passes and a contact time of six minutes. The solution remaining after the last pass was labelled No. 2.

The wool was thereafter washed with 100 ml. portions of de-ionized water, testing each portion for chloride ion. A total of ten washes, the last of which was free of chloride, was labelled No. 3.

The wool was then extracted with 100 ml. of hot chloride-free isopropanol which was recycled three times through the cloth. This solution was labelled No. 4, and the original solution of the quaternary salt having a concentration of 0.025 gm. per liter was labelled No. 5.

All of the solutions were evaporated to one-half their volume on the steam bath and diluted to original volume with isopropanol with the exception of No. 4 which was diluted with water.

All the samples were then treated with 0.2 ml. of 1:1 aqueous nitric acid and 1 ml. of a 1% aqueous solution of silver nitrate. Transmittance was then read in a spectrophotometer after two minutes in 1 cm. matched quartz cells at 400 millimicrons, using the blank No. 1 in the reference cell. The results are shown in Table I.

TABLE I

| Sample No. | Percent transmittance | Percent absorbance |
|---|---|---|
| 1 | 100.0 | |
| 2 | 93.0 | 0.0315 |
| 3 | 100.0 | |
| 4 | 98.5 | 0.0070 |
| 5 | 91.5 | 0.0385 |

The results indicate that the quaternary compound of Example 2 is substantive to wool and that at least 20% of the material was retained by the wool despite the short exposure and extensive rinsing with water.

EXAMPLE 6

Substantivity to human hair

Example 5 was repeated with a 10-gram sample of human hair identified by the commercial supplier as "virgin grey hair of Italian origin." Prior to use the hair was degreased, scoured and dried. Five samples were collected, identified as follows:

(1) De-ionized first rinse water
(2) 100 ml. of 0.025 gm./liter solution passed through hair—3 passes—time, 6 minutes
(3) Second rinse water
(4) Isopropanol stripping solution
(5) Stock solution: 0.025 gm./liter of Example 2 product The results are shown in Table II.

TABLE II

| Sample No. | Percent transmittance | Percent absorbance |
|---|---|---|
| 1 | 100.0 | |
| 2 | 98.5 | 0.0066 |
| 3 | 100.0 | |
| 4 | 97.5 | 0.0110 |
| 5 | 93.5 | 0.0292 |

The results of this experiment indicate that the quantity of quaternary compound substantively retained by the hair was approximately 38%.

EXAMPLE 7

Substantivity to human skin

Experiments demonstrating substantivity to human skin are difficult to perform on the basis of chloride ion analyses because of the tendency of the sweat glands to continuously secrete material having a high concentra- from the skin give rise to turbidity, and shedding of squamous cells which also give rise to turbidity. For the above reasons, no attempt was made to isolate a given skin area but the hand of an adult Caucasian male was used for the following:

One hand was thoroughly scoured and rinsed until rinsings with distilled water showed the absence of chloride ion. A final rinse with 100 ml. of de-ionized water was labelled Solution 1. The moist hand was wetted in a clean dish with 100 ml. of a 0.025 cm. per liter solution of the quaternary ammonium chloride of Example 2 for six minutes and the residual solution labelled Solution 2. The hand was thoroughly rinsed with 100 ml. portions of de-ionized water until free of ionic chloride. The last 100 ml. rinse was labelled Solution 3.

The quaternary salt which had been adsorbed on the skin was then stripped by immersion in 100 ml. of hot chloride ion-free isopropyl alcohol for six minutes. The alcohol remaining in the dish was labelled Solution 4. The hand was then thoroughly scoured, rinsed in distilled water until free of chloride and immersed in 100 ml. of fresh hot isopropyl alcohol for six minutes to determine how much sodium chloride is secreted in six minutes. This alcohol rinse was labelled Solution 4A. The stock solution containing 0.025 gm./liter of the compound of Example 2 was labelled Solution 5.

All solutions were made alkaline by the addition of 2 ml. of 0.1 N NaOH, evaporated to dryness on the steam bath and ashed at 600° C. to eliminate all oily or organic material removed from the skin. The ashed samples were dissolved in 50% aqueous isopropanol, acidified to a pH of 3.0–3.5 by the addition of 0.1 N $NHO_3$ and made up to 100 ml. with the aqueous alcohol. One ml. of 1% $AgNO_3$ was added to solution and after mixing the transmittance was read in a spectrophotometer at 400 millimicrons.

| Sample No. | Percent transmittance | Percent absorbance |
|---|---|---|
| 1 | 100.0 | |
| 2 | 94.5 | 0.0246 |
| 3 | 100.0 | |
| 4 | 91.5 | 0.0385 |
| 4A | 95.5 | 0.0200 |
| 5 | 92.0 | 0.0362 |

In calculating the results, the absorbance of Sample 4A was deducted from the absorbance of Sample 4. The results indicate that approximately 50% of the quaternary compound of Example 2 was absorbed on the skin.

The following formulations illustrate the utility of the products of this invention in a variety of cosmetic uses.

EXAMPLE 8

Acid skin cream

The following ingredients expressed in parts by weight were mixed with agitation.

Part A:
| | |
|---|---|
| Decyl oleate | 5.0 |
| Glycerol monostearate | 5.0 |
| Light mineral oil U.S.P. | 15.0 |
| Stearyl alcohol | 5.0 |
| Ethoxylated oleyl alcohol | 2.5 |
| p-Hydroxy benzoic acid ester | 0.2 |

Part B:
| | |
|---|---|
| Quaternary product of Example 2 | 2.0 |
| Propylene glycol | 5.0 |
| Water | 60.1 |
| Phosphoric acid | 0.2 |
| | 100.0 |

Parts A and B were warmed to 75° C., B was added to A with stirring and cooled to 35° C. with agitation. A smooth slightly acid skin cream having excellent emollient properties was obtained.

EXAMPLE 9

After-save lotion

An after-save lotion was formulated from the following ingredients expressed in parts by weight.

Part A:
| | |
|---|---|
| Special denatured alcohol 40 | 50.0 |
| Propylene glycol | 5.0 |
| Perfume | 2.0 |

Part B:
| | |
|---|---|
| Quaternary product of Example 2 | 2.5 |
| Water | 40.5 |
| | 100.0 |

Prepared Parts A and B as above and added Part B to Part A with agitation at room temperature. An aftershave lotion was obtained which gave a much desired "buttery" feel to the skin when applied, and provided an excellent emollient effect after shaving.

EXAMPLE 10

Anti-drandruff shampoo

A shampoo, useful for the removal of dandruff from the hair, was formulated from the following ingredients, expressed as parts by weight.

Part A:
| | |
|---|---|
| Lauryl polyoxyethylene sulfate | 20.00 |
| Lauroyl diethanolamide | 10.00 |
| Lauroyl monoethanolamide | 2.00 |
| Quaternary product of Example 2 | 2.00 |
| Water | 63.50 |

Part B:
| | |
|---|---|
| Octyl ester of p-hydroxybenzoic acid | 0.25 |
| Isopropyl alcohol | 2.00 |

Part C:
| | |
|---|---|
| Perfume | 0.25 |
| | 100.00 |

The ingredients in Part A were mixed and heated to 70° C. with stirring to effect solution. Part B was heated to 65° C. and added with stirring to Part A. When cool, the perfume in Part C was added. There was obtained a product of increased viscosity which gave a rich thick foam when used as a shampoo.

EXAMPLE 11

Hair-styling gel

A hair-styling gel useful for maintaining hair in a given hair-set was formulated from the following ingredients, expressed in parts by weight.

Part A:
| | |
|---|---|
| Carboxylated vinyl polymer | 0.90 |
| Water | 44.10 |

Part B:
| | |
|---|---|
| Quaternary compound of Example 2 | 1.00 |
| Polyvinylpyrrolidone | 1.00 |
| Sodium hydroxide | 0.36 |
| Water | 52.64 |
| | 100.00 |

Part B was prepared as follows: The quaternary compound was dissolved in the water, and the polyvinylpyrrolidone added with stirring. When solution was complete the sodium hydroxide was added, followed by Part A with mechanical mixing. A clear gel was produced having improved viscosity characteristics and hair-setting properties.

It will be apparent to those having skill in the art that a variety of monosaccharic acids, lactones, keto-sugar acids and the like, including pentahydroxy acids, may be substituted without departing from the scope of the invention disclosed herein.

Similarly, other diamines in which one amino group has the hydrogens replaced by acylic or alicyclic radicals may be used instead of the N,N-dimethyl 1,3-propane diamine. Suitable examples are N,N-diethylethylene diamine, N,N-diethyl - 1,4 - butanediamine, N,N-bis(beta-hydroxyethyl) ethylene diamine, 4-dimethylamino cyclohexylamine and the like.

Quaternary salts may be prepared from a wide variety of $C_1$–$C_{12}$ alkyl chlorides and bromides, aralkyl halides such as benzyl chloride and alicyclic halides such as cyclopentyl and cyclohexyl chloride. Bis-quaternary salts may be prepared from dihalo alkylene compounds such as 1,3-dichloro propane, 1,4-dibromo butane, 1,6-dibromohexane and bis-chloromethyl compounds such as 1,4-bis-chloromethyl benzene.

It will be understood by those having skill in the art that this invention is not limited to the specific examples which have been offered as particular embodiments, and that modifications can be made without departing from the spirit thereof.

What is claimed is:

1. A quaternary chloride salt of N,N,N-trialkylaminoalkylene gluconamide selected from the group consisting of

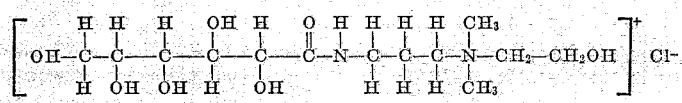

and

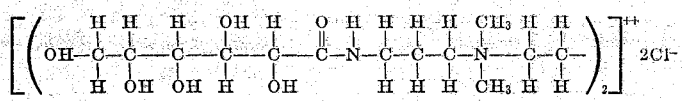

2. Composition according to claim 1 wherein said quaternary salt is

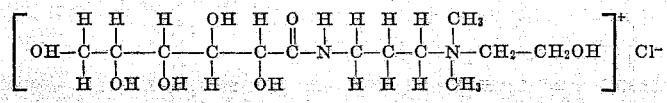

3. Composition according to claim 1 wherein said bis-quaternary salt is

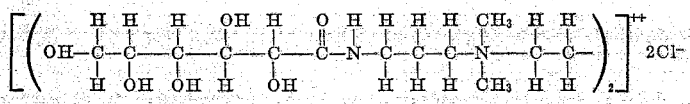

References Cited

FOREIGN PATENTS

| | | | |
|---|---|---|---|
| 1,484,601 | 5/1967 | France | 260—561 B |
| 1,123,468 | 9/1962 | Germany | 260—561 B |

OTHER REFERENCES

Geyer, C. A.: 61: 13397h.

LEWIS GOTTS, Primary Examiner

E. G. LOVE, Assistant Examiner

U.S. Cl. X.R.

424—320